US009981151B2

(12) United States Patent
Mabry, Jr. et al.

(10) Patent No.: US 9,981,151 B2
(45) Date of Patent: May 29, 2018

(54) POWER AND DATA PORT INTERFACE FOR ELECTRONIC DEVICES OPERATING IN EXTREME ENVIRONMENTS

(71) Applicants: James A. Mabry, Jr., Anthem, AZ (US); Danny J. Kleitsch, Scottsdale, AZ (US); Thomas P. Smith, Paradise Valley, AZ (US)

(72) Inventors: James A. Mabry, Jr., Anthem, AZ (US); Danny J. Kleitsch, Scottsdale, AZ (US); Thomas P. Smith, Paradise Valley, AZ (US)

(73) Assignee: ALL CLEAR FIRE SYSTEMS, LLC, Phoenix, AZ (US)

( * ) Notice: Subject to any disclaimer, the term of this patent is extended or adjusted under 35 U.S.C. 154(b) by 0 days. days.

(21) Appl. No.: 15/094,795

(22) Filed: Apr. 8, 2016

(65) Prior Publication Data

US 2016/0302318 A1 Oct. 13, 2016

Related U.S. Application Data

(60) Provisional application No. 62/145,224, filed on Apr. 9, 2015.

(51) Int. Cl.

| | |
|---|---|
| ***H01R 9/00*** | (2006.01) |
| ***H02B 1/04*** | (2006.01) |
| ***A62C 31/24*** | (2006.01) |

(52) U.S. Cl.

CPC .................................... *A62C 31/24* (2013.01)

(58) Field of Classification Search

CPC ...................................................... A62C 31/24

USPC .......................................................... 361/822

See application file for complete search history.

(56) References Cited

U.S. PATENT DOCUMENTS

| | | | |
|---|---|---|---|
| 3,706,882 A | 12/1972 | Eby | |
| 3,805,516 A | 4/1974 | Eastham et al. | |
| 3,808,577 A * | 4/1974 | Mathauser ......... | H01R 13/6205 439/180 |
| 3,943,312 A | 3/1976 | Bernstein et al. | |
| 4,031,775 A | 6/1977 | Petty | |
| 4,548,092 A | 10/1985 | Strong, Jr. | |
| 5,096,230 A * | 3/1992 | Pausch .................... | B08B 15/00 285/304 |

(Continued)

OTHER PUBLICATIONS

All Clear Fire Lights—Archived Website Publication—Captured Jan. 29, 2011—http://web.archive.org/web/20110129143936/http://www.allclearfirelights.com/.

*Primary Examiner* — Hung S Bui

(74) *Attorney, Agent, or Firm* — Venjuris, P.C.

(57) ABSTRACT

This invention is embodied in a power/data interface for connecting two modules at the leading edge (i.e., the "tip of the spear") of a fire suppression operation. The power/data interface serves as an operational link between a housing device (for protecting a battery and other electronic equipment) and an accessory like a thermal imaging camera ("tic" camera), video camera or other sensory perceiving device. The power/data interface not only provides power to an accessory by connecting it to a power source, but the power/data interface can exchange data between the accessory and the housing device. Such exchange of data enables electronics stored within the housing device to record and protect data captured by accessory on a flash drive or other recordable media. In addition to providing power and exchanging data with an accessory, the power/data interface can also accept battery pack that can be used to recharge a battery or other power source located inside the housing device.

12 Claims, 22 Drawing Sheets

(56) References Cited

U.S. PATENT DOCUMENTS

| | | | | |
|---|---|---|---|---|
| 5,092,504 | A | 12/1992 | Hannes et al. | |
| 5,485,811 | A | 1/1996 | Jacobsen et al. | |
| 5,795,053 | A | 8/1998 | Pierce | |
| 5,873,647 | A | 2/1999 | Kurtz | |
| 6,036,069 | A | 3/2000 | Sayegh | |
| 6,116,520 | A | 9/2000 | Lee | |
| 7,739,921 | B1 | 6/2010 | Babcock | |
| 7,775,801 | B2 * | 8/2010 | Shiff | H01R 13/6205 439/39 |
| 7,823,801 | B2 | 11/2010 | McGarry et al. | |
| 7,874,844 | B1 * | 1/2011 | Fitts, Jr. | H01R 13/6205 439/218 |
| 7,942,544 | B2 | 5/2011 | Smathers | |
| 7,969,414 | B2 | 6/2011 | Wang et al. | |
| 7,992,648 | B2 | 8/2011 | Groonwald | |
| 8,109,645 | B2 | 2/2012 | Liao | |
| 9,197,010 | B2 * | 11/2015 | Greig | H01R 13/6205 |
| 9,413,103 | B2 * | 8/2016 | Pons Gonzalez | H01R 13/6205 |
| 9,531,118 | B2 * | 12/2016 | Byrne | H01R 13/2421 |
| 9,568,678 | B2 * | 2/2017 | Isenhour | G02B 6/4204 |
| 9,614,322 | B1 * | 4/2017 | Gibboney, Jr. | H01R 13/2421 |
| 9,791,634 | B2 * | 10/2017 | DiFonzo | G02B 6/3817 |
| 2004/0069826 | A1 | 4/2004 | Neil | |
| 2004/0134953 | A1 | 7/2004 | Perez | |
| 2004/0159690 | A1 | 8/2004 | Hansen | |
| 2006/0131038 | A1 | 6/2006 | Lichtig | |
| 2006/0180321 | A1 | 8/2006 | Yoshida | |
| 2009/0050835 | A1 | 2/2009 | Boise | |
| 2011/0187524 | A1 | 8/2011 | Cochran, III | |
| 2012/0061108 | A1 | 3/2012 | Cerrano | |
| 2012/0120630 | A1 | 5/2012 | Liao et al. | |

* cited by examiner

POWER AND DATA PORT INTERFACE FOR ELECTRONIC DEVICES OPERATING IN EXTREME ENVIRONMENTS

CROSS-REFERENCE TO RELATED APPLICATIONS

This application claims benefit of U.S. Provisional Application No. 62/145,224 filed Apr. 9, 2015.

FIELD OF INVENTION

This invention generally relates to firefighting equipment and more particularly pertains to devices power and data port interfaces used for housing optics and battery-powered electronics at the leading edge of a fire suppression operation.

BACKGROUND

Today's fire fighters are asked to fill many roles and operate on diverse emergency scenes. These scenes include structural firefighting, wild land firefighting, vehicular accidents, technical rescues, hazardous material exposures, and emergency medical incidents. All of these incident scenes present unique and different challenges.

Temperatures at the nozzle end of a hand line (i.e., the "tip of the spear") can exceed 1,000° F. Such extreme temperatures make operating battery powered electronic devices such as high intensity lighting, infrared cameras, video cameras challenging because the battery power needed is prone to failure and even explosion at such extreme temperatures. Having a device that can protect electronics, particularly batteries and electronic data, at the leading edge of a fire suppression operation would allow firefighters access to critical electronic components where it is needed most. Likewise, monitoring current conditions and providing warning systems to alert fire fighters of hazardous conditions can be critical to avoiding injury and locating lost or incapacitated fire fighters.

Excessive temperature extremes, moisture, contaminated/flammable atmospheres, and other difficult and unknown hazards force fire fighters to use a minimum amount of tools that contain batteries and other electronic components subject to failure. Hand held radios, flashlights, and power tools are often undependable because of the harsh conditions. A related danger is the fact that these first responders often enter structures filled with natural gas and other hazardous materials sensitive to explosions related to static discharge or random, uncontrolled electrical impulses.

These fire fighters, operating in forward positions (tip of the spear), have the best vantage point to quickly and efficiently neutralize the threat, but are severely limited because of the nature of the tools with which they are currently equipped. Current prior art tools and techniques are not sufficient for the demands of the job.

While there have been attempts to equip fire fighters, paramedics, emergency medical technicians, and other first responders with helmet-mounted or body mounted video cameras. These cameras cannot presently be used at the leading edge of a fire suppression operation because of the extreme heat. In addition, these cameras are basically useless in low light/no light environments. They record what they see and in limited visibility situations they are unable to see much, if anything. The dynamic nature of these scenes would benefit from increased visibility and live video streaming to enhance communication and protect the privacy of all people on and in the vicinity of the emergency scene.

Therefore, it would be desirable to provide a device and method that overcomes the above problems. The device and method would provide a hands-free tool to assist fire crews involved in search, rescue, and fire suppression efforts. The device and method would provide enhanced lighting, video monitoring, and other sensory informational capability to be used in firefighting operations inside or outside a structure.

SUMMARY

The present invention is incorporated in a power and data port interface illustrated in the accompanying schematics, presented in this specification, provides an original solution to enhance electronic device operability and life safety in extreme environments.

The power/data interface 100 is preferably located on the outside face of a device to be used at the leading edge (i.e., the "tip of the spear") of a fire suppression operation. An example of such a device is shown in FIGS. 1-11, and specified in U.S. Pat. No. 8,919,979 (the '979 patent), which is incorporated herein by reference. In short, the '979 patent describes a housing device 10 for protecting a variety of electronic circuitry against the extreme conditions encountered at the leading edge of a fire suppression operation. As described therein, the housing device 10 can be attached to a fire hose, water discharge outlet on a fire engine/ladder truck or carried by a firefighter. Housing device 10 is sometimes referred to as a "knoblite" in the drawings.

Power/data interface 100 serves as an operational link between housing device 10 and an accessory 308. An "accessory" as used herein is a detachable electronic device for use in a fire zone. Example accessories 308 include thermal imaging cameras (or "tic cameras") 310, sensory devices 312, or video cameras 313. The power/data interface 100 not only provides power to accessory 308 by connecting it to a power source (such as power source 70) located inside the housing device 10, but the power/data interface 100 can exchange data between the accessory 308 and the housing device 10. Such exchange of data enables the housing device 10 to record and protect data captured by accessory 308 on a flash drive or other recordable media located inside housing device 10.

In addition to providing power and exchanging data with an accessory 308, the power/data interface 100 can also accept battery pack 314 that can be used to recharge a battery or other power source located inside the housing device 10, such as power source 70.

In the alternative, the data/power interface 100 can also be located on a hand-grip unit 330. The hand-grip unit 330 can also house batteries and recording media to power accessory 308 and record data captured by accessory 308.

Those in the art will recognize other electronic devices that could be useful in these circumstances. Likewise, while this power and data port interface is demonstrated to be useful in firefighting applications, it can be used in any application where individuals work or recreate in environments detrimental to electronic component operability.

It is an object of this invention to support the transmittal of real-time video streaming from the "tip of the spear."

It is another object of this invention to support thermal imaging cameras connected to the device: short wave infrared, ultraviolet, and all cameras across the visible/non-visible light spectrum.

It is an another object of this invention to house electronics for supporting a video camera capable of capturing video images and transmitting those images via wireless technology to a mobile device or monitor at a remote location.

It is another object of this invention to provide incident commanders and alarm room staff with live, streaming video from the scene that enables them to make more timely and prudent decisions to assist on scene personnel.

It is another object of this invention to enable firefighters and emergency medical personnel to send live, streaming video to hospital emergency rooms to allow doctors, nurses, and staff to make better triage decisions and promote better patient outcomes. In essence, all those involved in emergency scene management will be able to visually monitor and evaluate scene operations while respecting the privacy and dignity of those involved in those operations.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
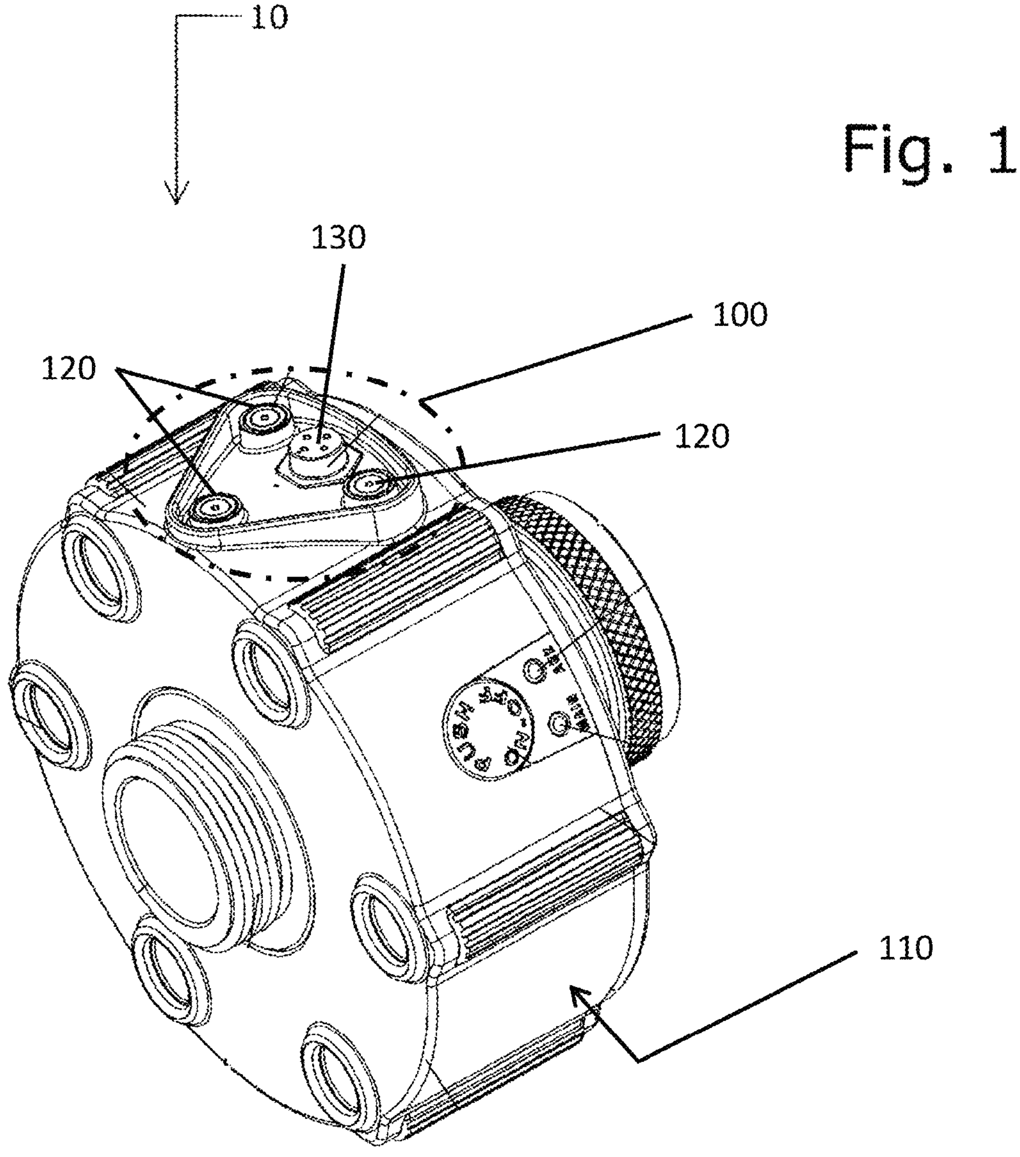
FIG. 1 is a perspective view of an embodiment of housing device 10.
Figure 2:
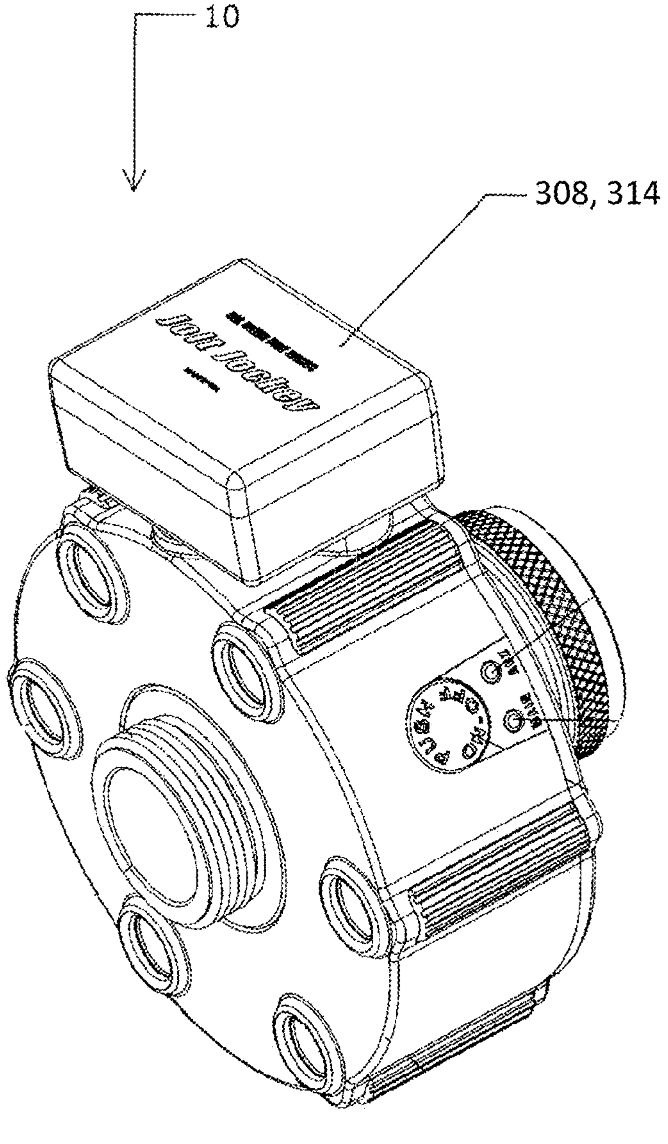
FIG. 2 is a perspective view of housing device 10 in accordance with FIG. 1 with a removable battery pack attached thereto.

Firefighting personnel will most typically use the present invention during a structure fire to advance into and through the structure. In operation, a firefighter would use the device at the nozzle end of a hand line to illuminate the firefighter's path and search the structure and apply a burst of water and/or other extinguishing agent or propellant from the attached hose. Under these operating conditions, the housing device 10 will see a temperature of at least 500° F. for 15 minutes, which is two and a half times the specified maximum temperature for typical batteries known in the art. Degraded battery performance not only subjects most electronics devices to failure but also exposes firefighting personnel to unacceptable risks of injury or death.

Standard thermal management strategies for devices under these extreme conditions involve components, assemblies, and constructions to manage heat generated by the power dissipation of electrical components. Standard thermal management generally includes contact of electrical components or the component packaging with at least one heat sink component or structure that conducts heat away from the electrical components to be dissipated through either conduction or radiation. This standard strategy is effective because the ambient air temperature is lower than that of the electrical components. Standard thermal management strategies are however unacceptable for fire-fighting environments, which demand a different strategy.

Contrary to the normal operating conditions that enable standard thermal management strategies to work, the ambient air temperatures during a structure fire are extreme and render standard thermal management strategies inappropriate. For example, flashover (i.e. the immediate combustion of flammable materials due to extreme heat), is reached when the average upper gas temperature in the room exceeds about 600° F. Prior to flashover, there may be flame temperatures of over 900° F. in certain areas although wide spatial variations are possible. Peak fire temperature in a room or structure fire is estimated to be around 1200° F., although a typical post-flashover room fire will more commonly be 900~1000° F. The temperatures present in a fire can damage electronics and particularly affect the performance of batteries. Temperatures above 90° C. (or 194° F.) adversely affect battery performance.

In addition, other environmental aspects can be hazardous to electronics. Both water and dirt can damage electronics. And most of the time, a firefighter's visibility is severely limited by smoke and darkness. So joining two items, like a battery pack to a thermal imaging camera can prove difficult and time consuming.

The present invention provides a significant improvement over the prior art in the field of fire-fighting tools and technology because not only does it protect electronic components from extreme temperatures, water, and dirt, but it allows two items, namely a power supply and a detachable electronic device to be joined together primarily by feel.

As shown in FIGS. 1-30, the power/data interface 100 serves as an operational link between housing device 10 and accessory 308. For the purpose of this specification, an "accessory" is any detachable electronic device that might be useful in a fire suppression or other emergent situation. A thermal imaging camera ("tic camera") 310, a sensory device 312 (for recording temperature, sounds, etc.), a video camera 313, and a battery pack 314 are all examples of an accessory 308.

Figure 4:
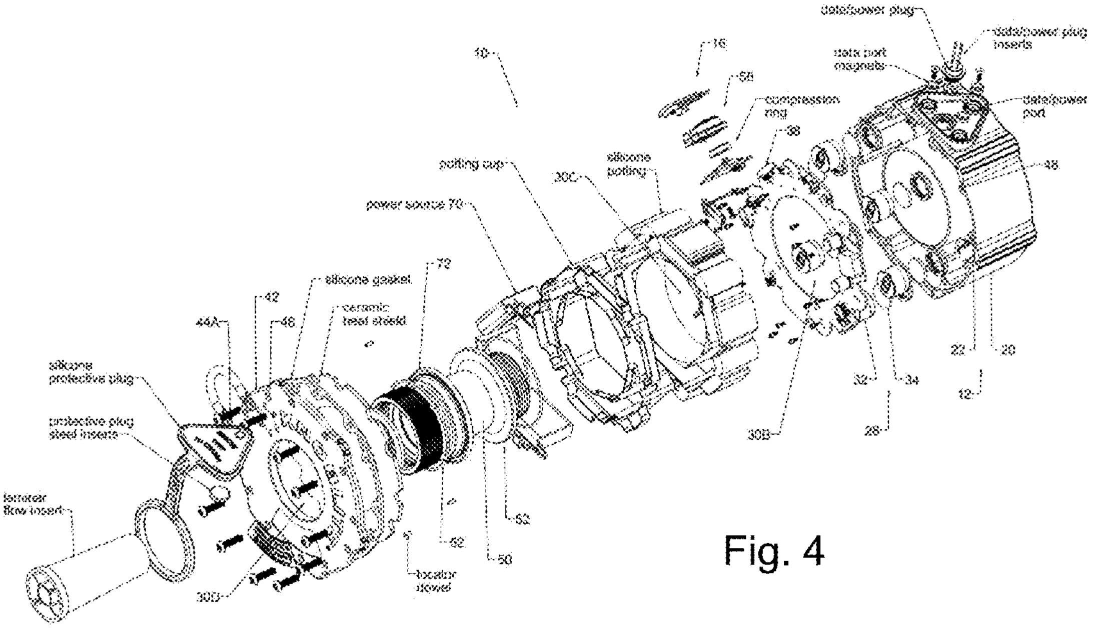
FIG. 4 is an exploded side view of one embodiment of housing device 10.
Figure 5:
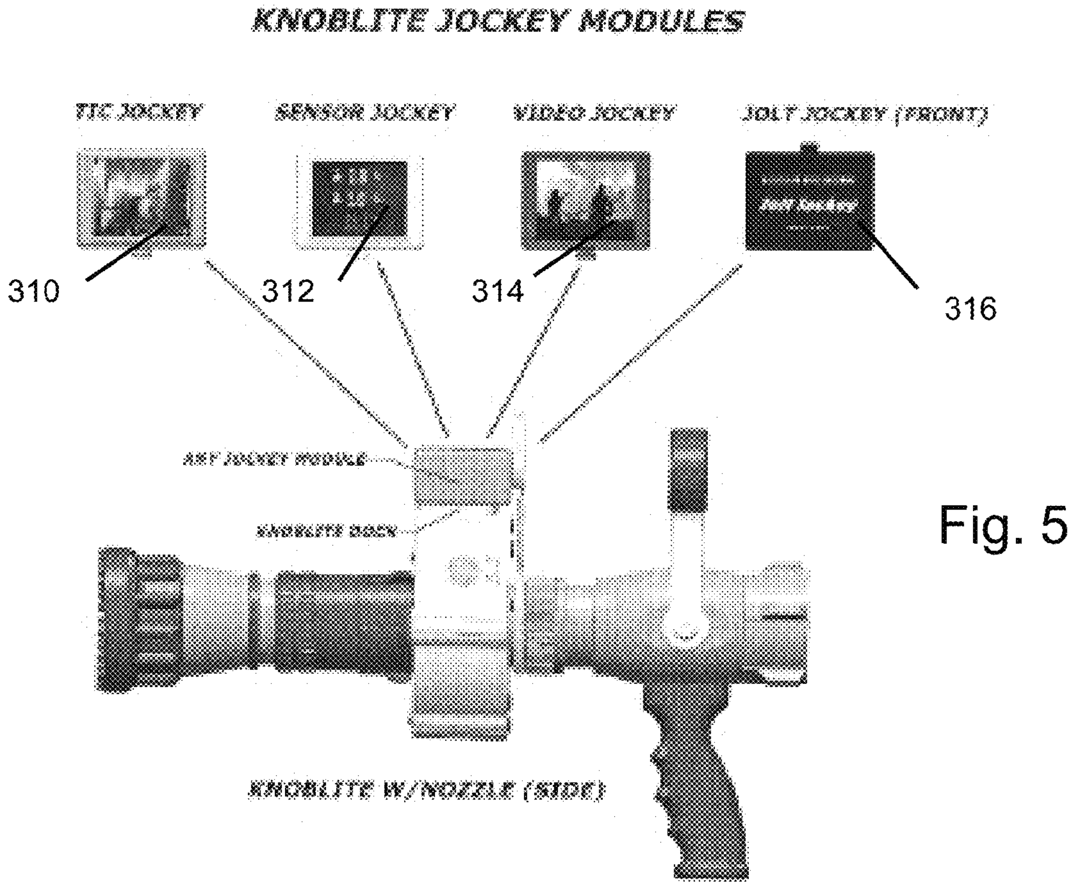
FIG. 5 is a side view of housing device 10 attached to a nozzle with a removable battery pack connected to the housing device 10.
Figure 6:
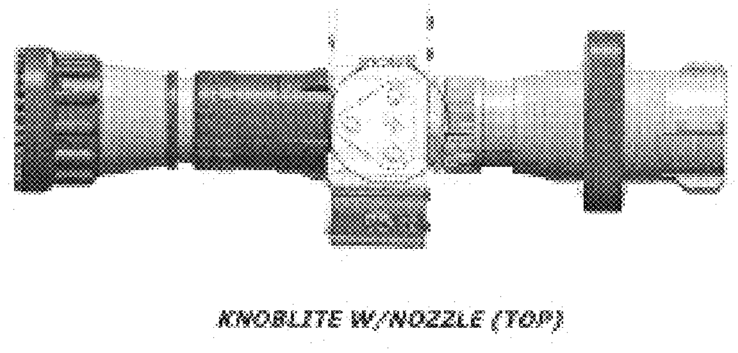
FIG. 6 is a side view of housing device 10 connected to a nozzle without a removable battery pack.
Figure 7:
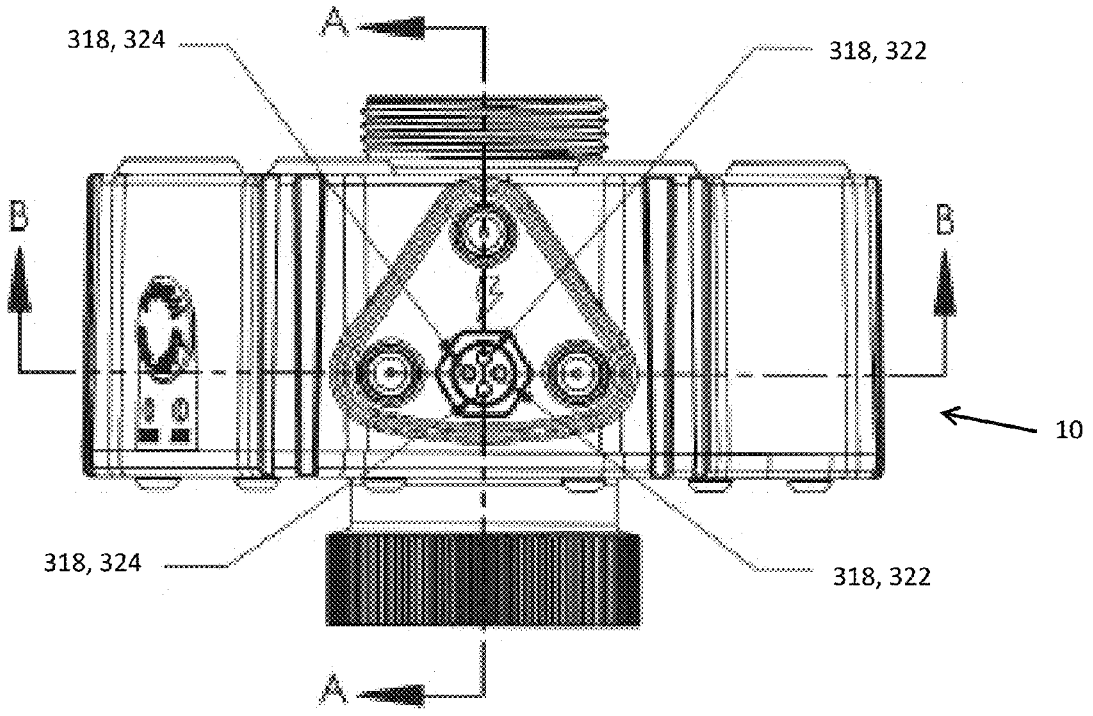
FIG. 7 is top view of an embodiment of the power/data interface.
Figure 8:
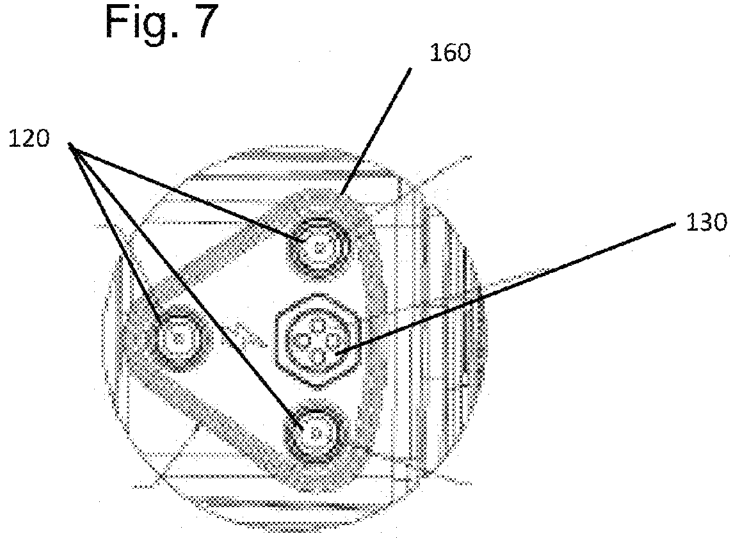
FIG. 8 is an inset view of an embodiment of the power/data interface 100.
Figure 9:
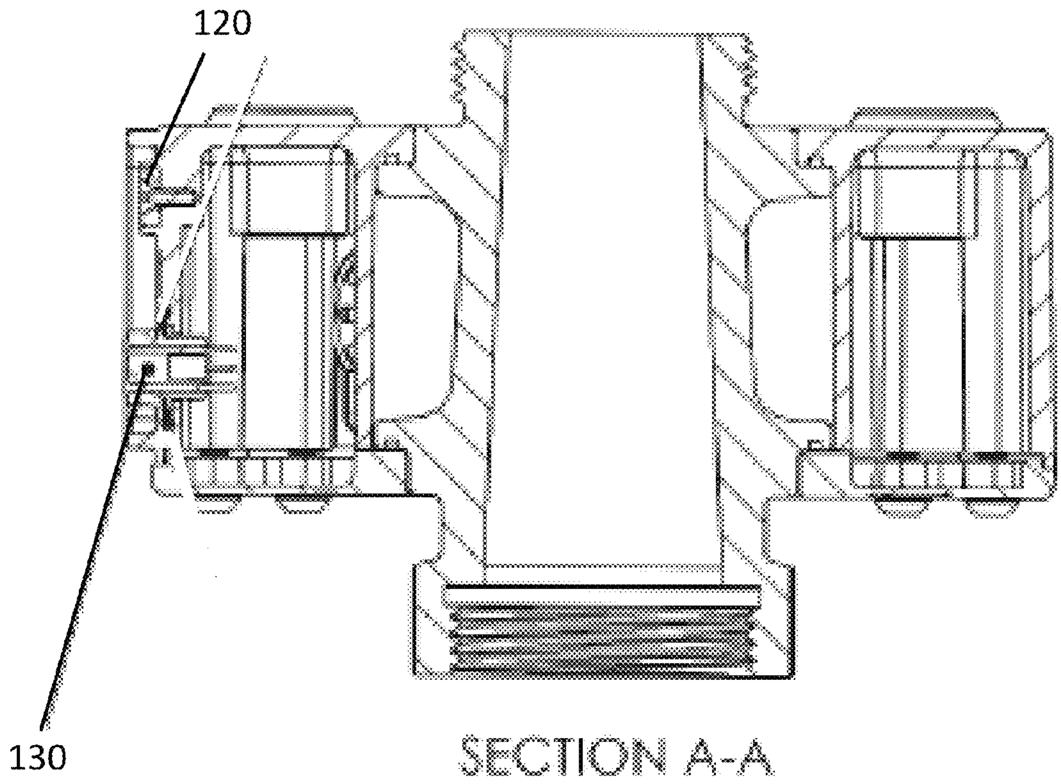
FIG. 9 is sectional view taken along cut line A-A of FIG. 7.
Figure 10:
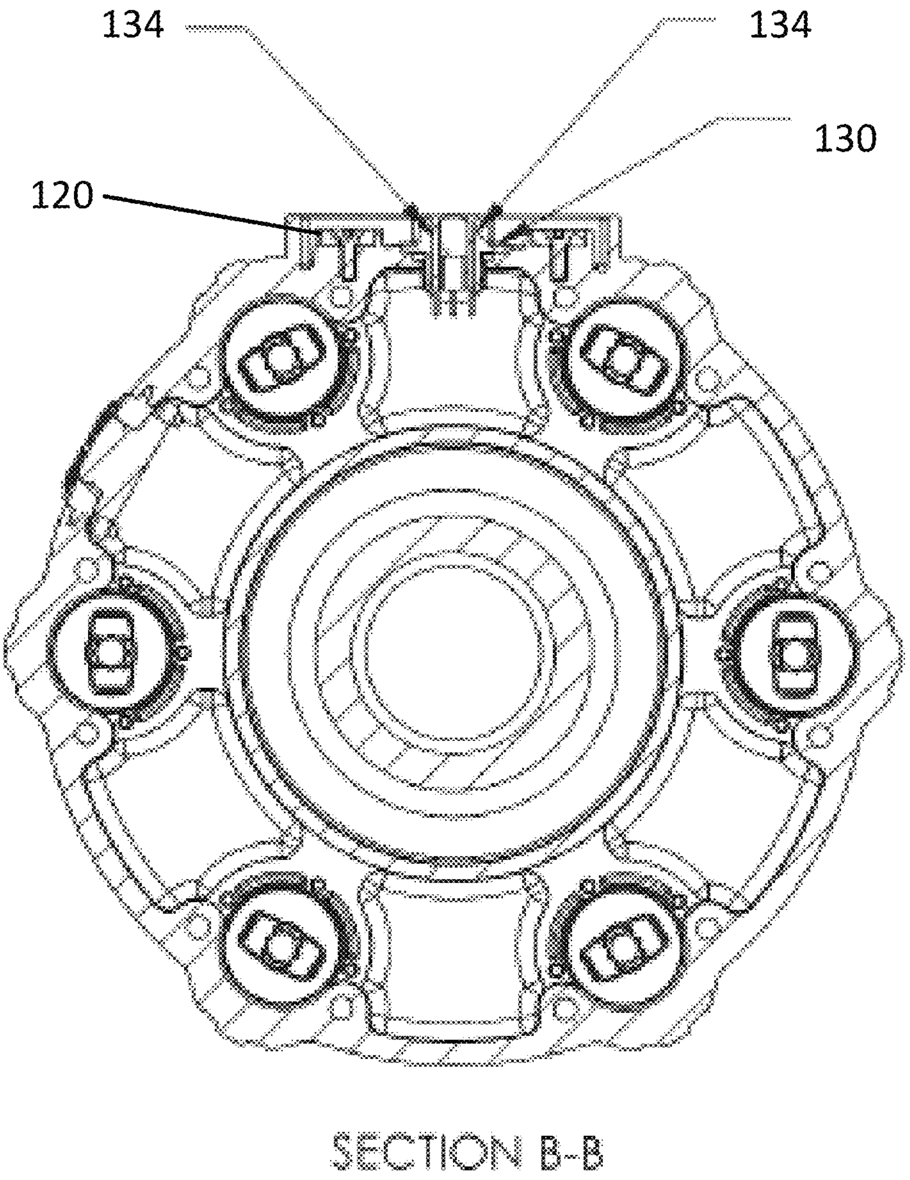
FIG. 10 is sectional view taken along cut line B-B of FIG. 7.
Figure 11:
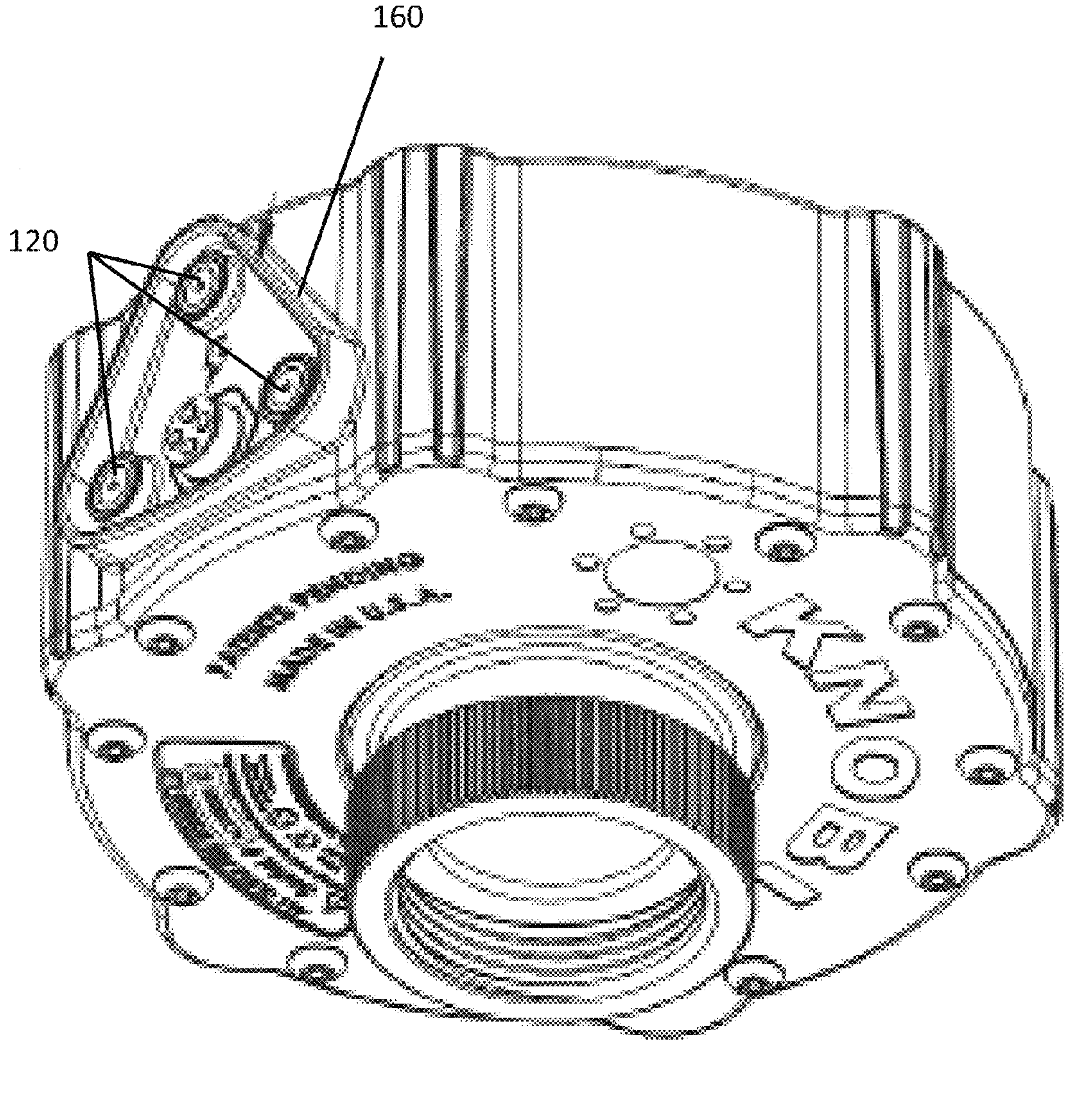
FIG. 11 is a perspective view of an embodiment of the device of the present invention.

FIG. 1 shows a housing 10 for use at the leading edge of a fire suppression operation. An example a housing 10 for use at the leading edge of a fire suppression operation is specified in U.S. Pat. No. 8,919,979 (the '979 patent). As shown in FIG. 4, the housing 10 encloses a power source 70. Typically, the power source is a battery. When an accessory 308 is connected to the housing 10 the power source 70 can power the accessory 308. When a battery pack, such as battery pack 314 is connected to the housing 10, battery pack 314 can charge the power source 70.

The power/data interface 100 is located on an exterior surface 110 of the housing 100 enclosing a battery. This allows accessories 308 to be connected and disconnected to the housing 10 quickly. To assist in the quick connect/disconnect, it is preferred to have magnetic connectors located on the exterior face 110. For the purpose of this specification, magnetic connector 110 is a magnet or something capable of coupling (or mating) to a magnet, like metal.

Figure 3:
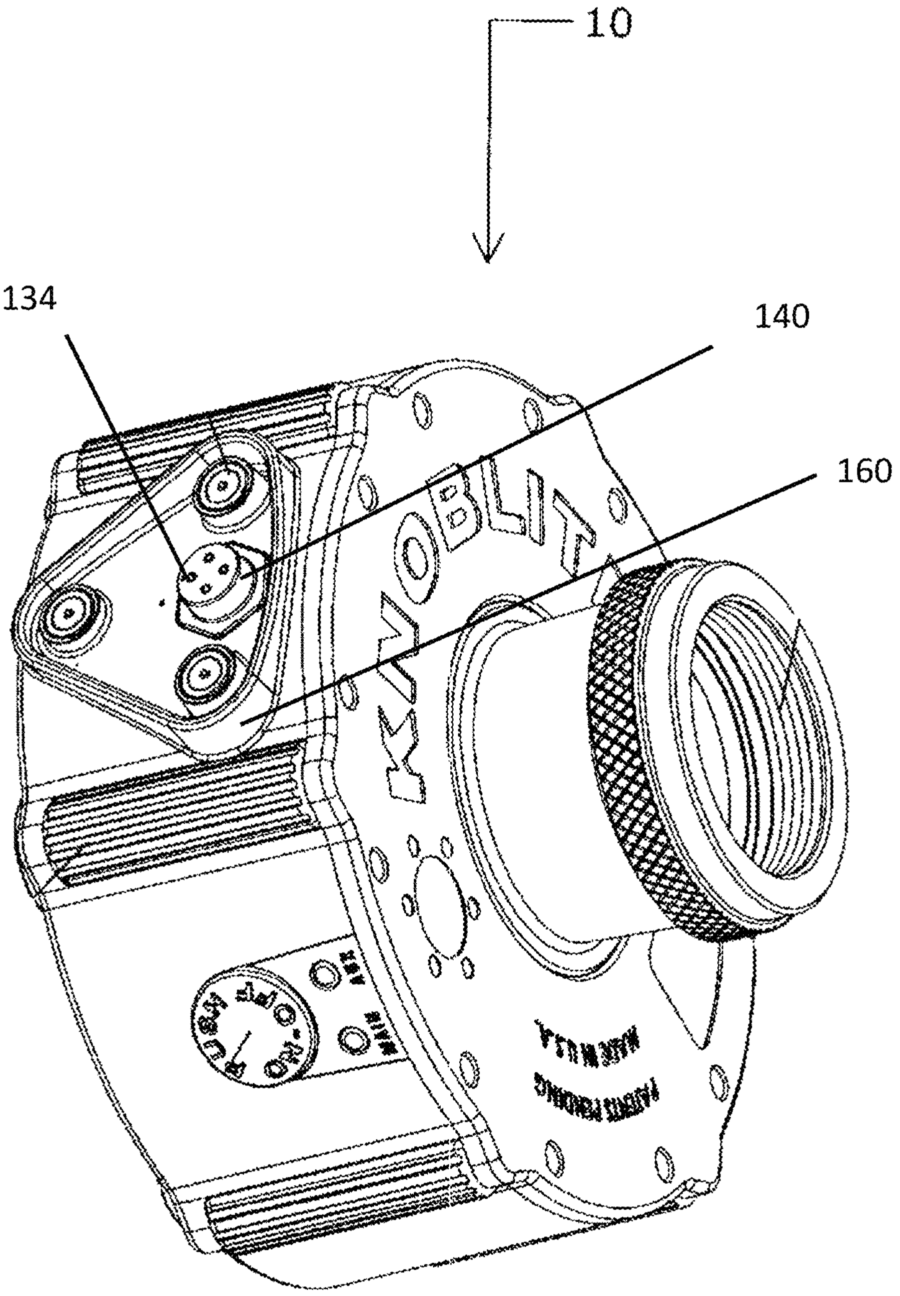
FIG. 3 is a second perspective view of an embodiment of housing device 10.
Figure 22:
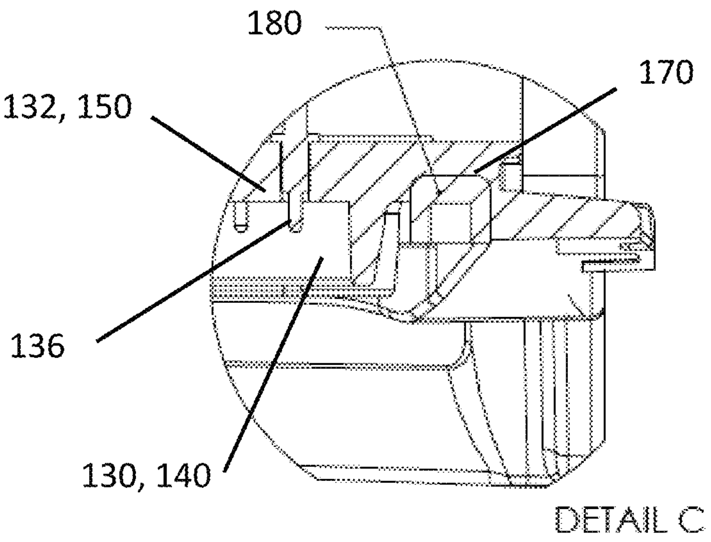
FIG. 22 is detail C of FIG. 21.
Figure 23:
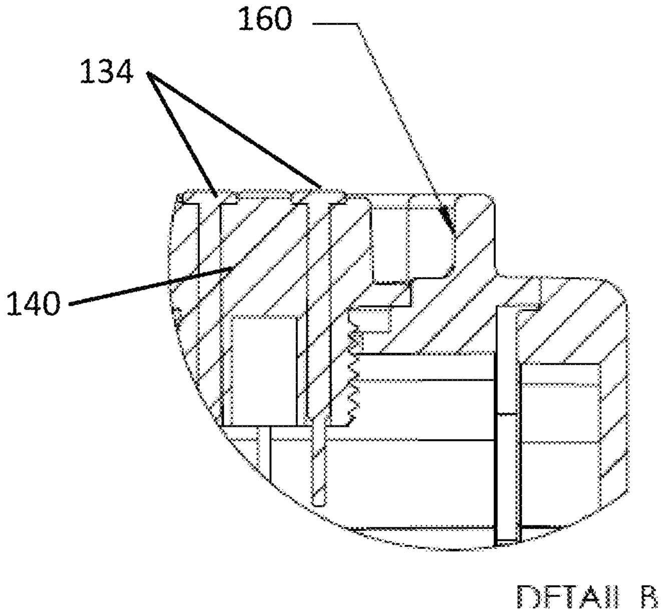
FIG. 23 is detail B of FIG. 21.
Figure 24:
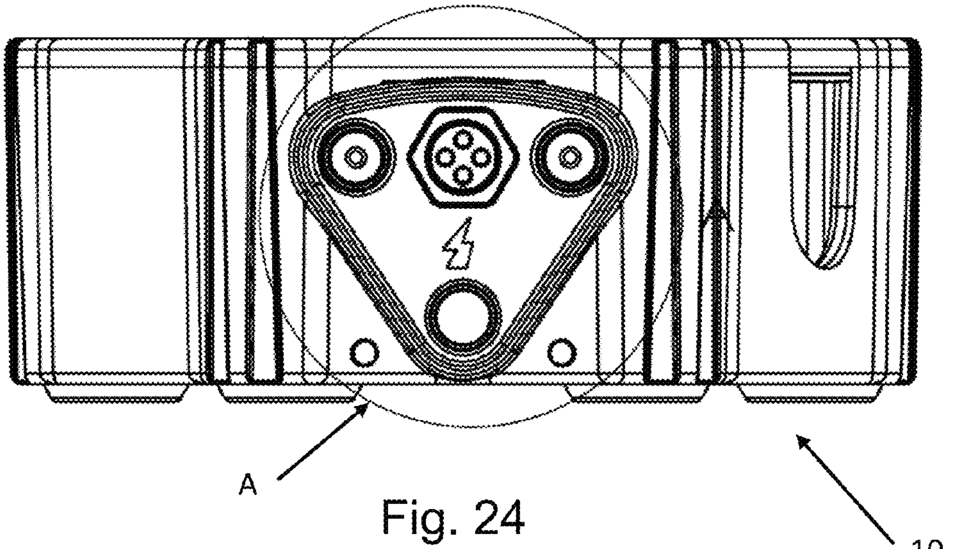
FIG. 24 is top view of a housing device 10.
Figure 25:
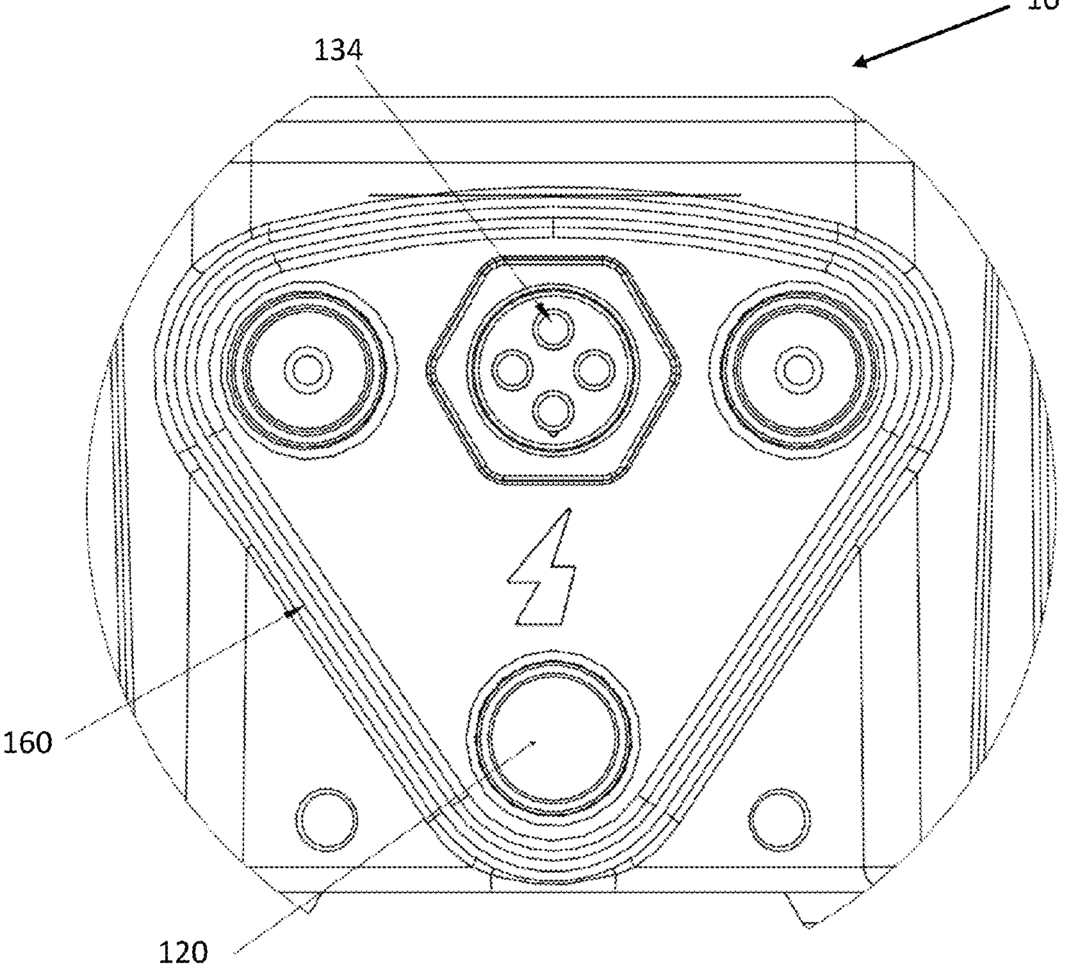
FIG. 25 is detail A of FIG. 24.
Figure 26:
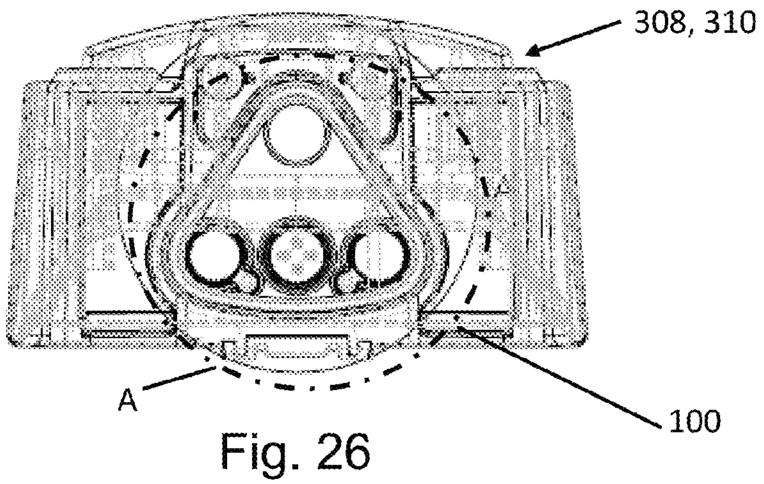
FIG. 26 is bottom view of a thermal imaging camera 308.
Figure 27:
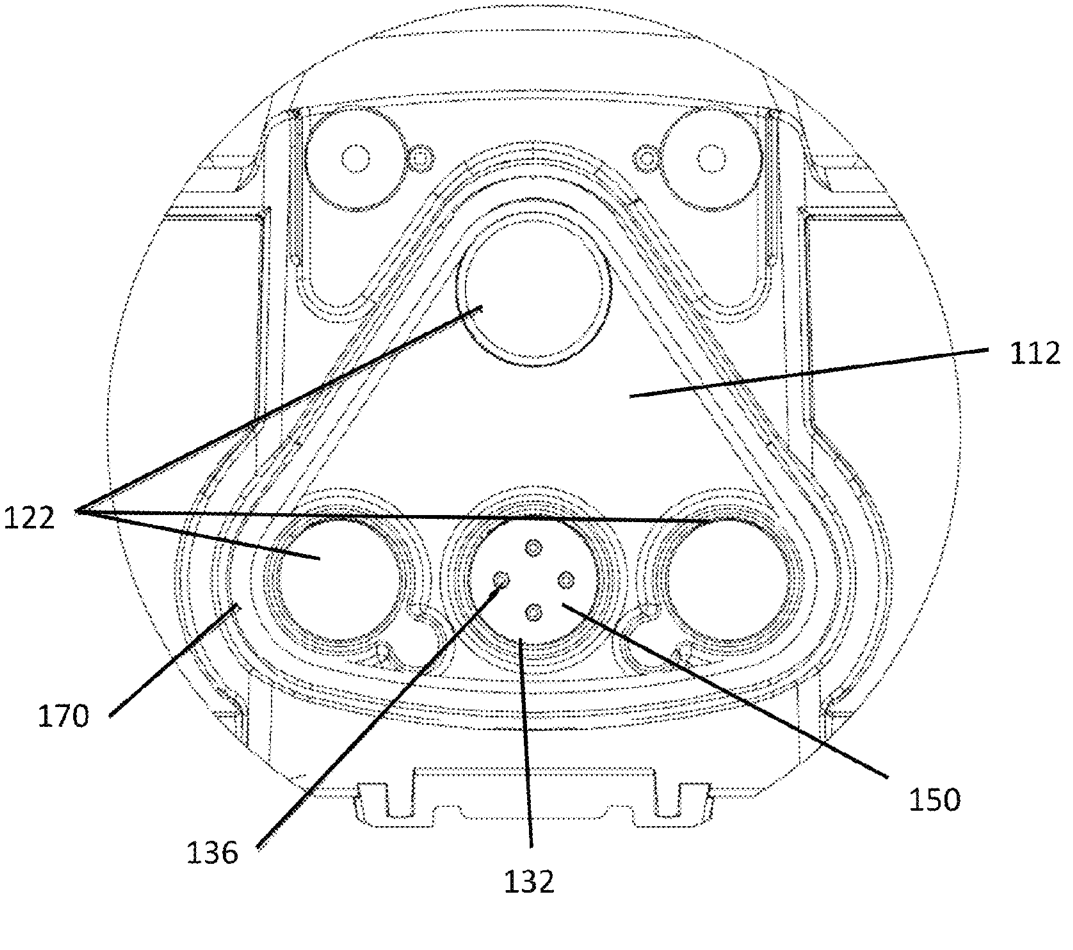
FIG. 27 is an enlarged view of detail A of FIG. 26.
Figure 28:
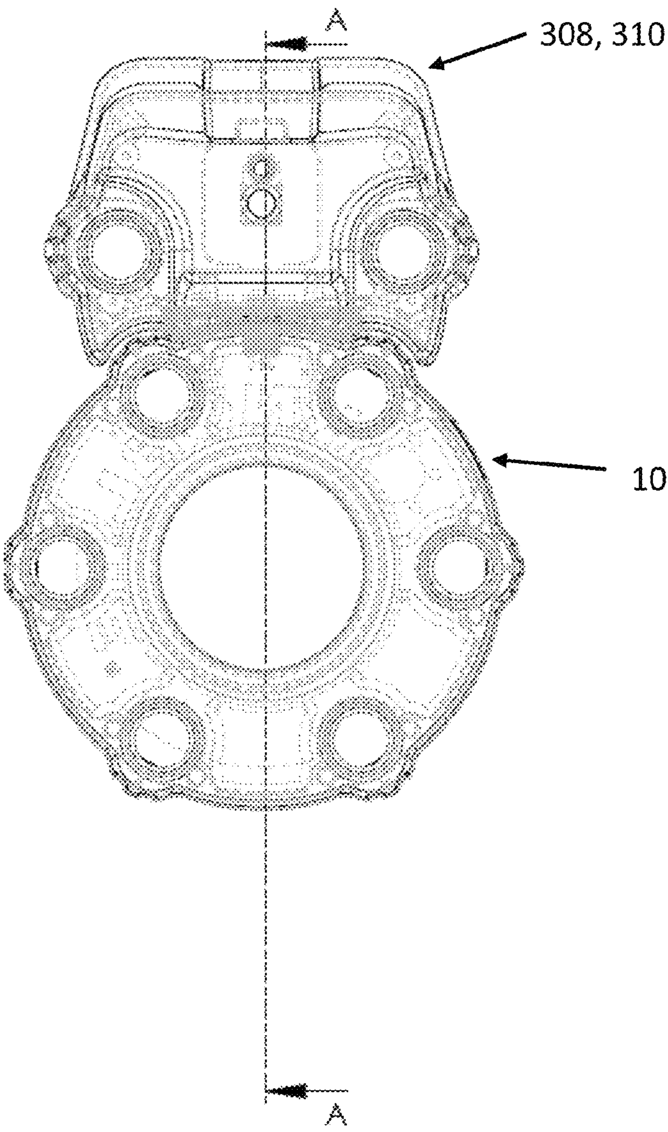
FIG. 28 is front view of a housing device 10 and an accessory 308, specifically, a thermal imaging camera 310.
Figure 29:
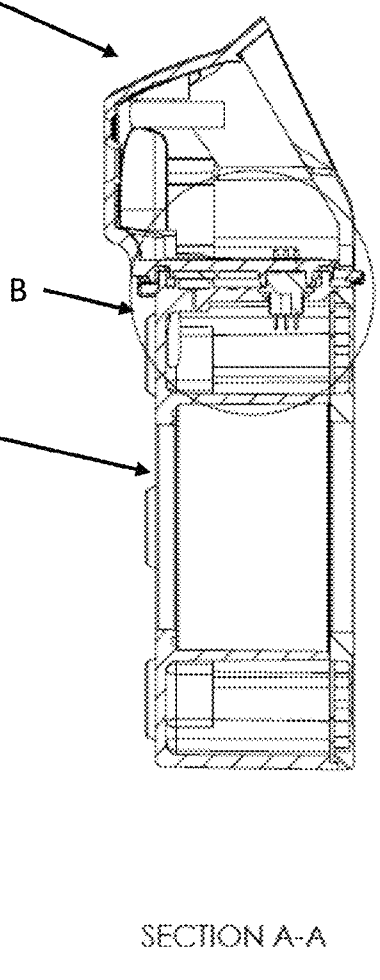
FIG. 29 is section A-A from FIG. 28.
Figure 30:
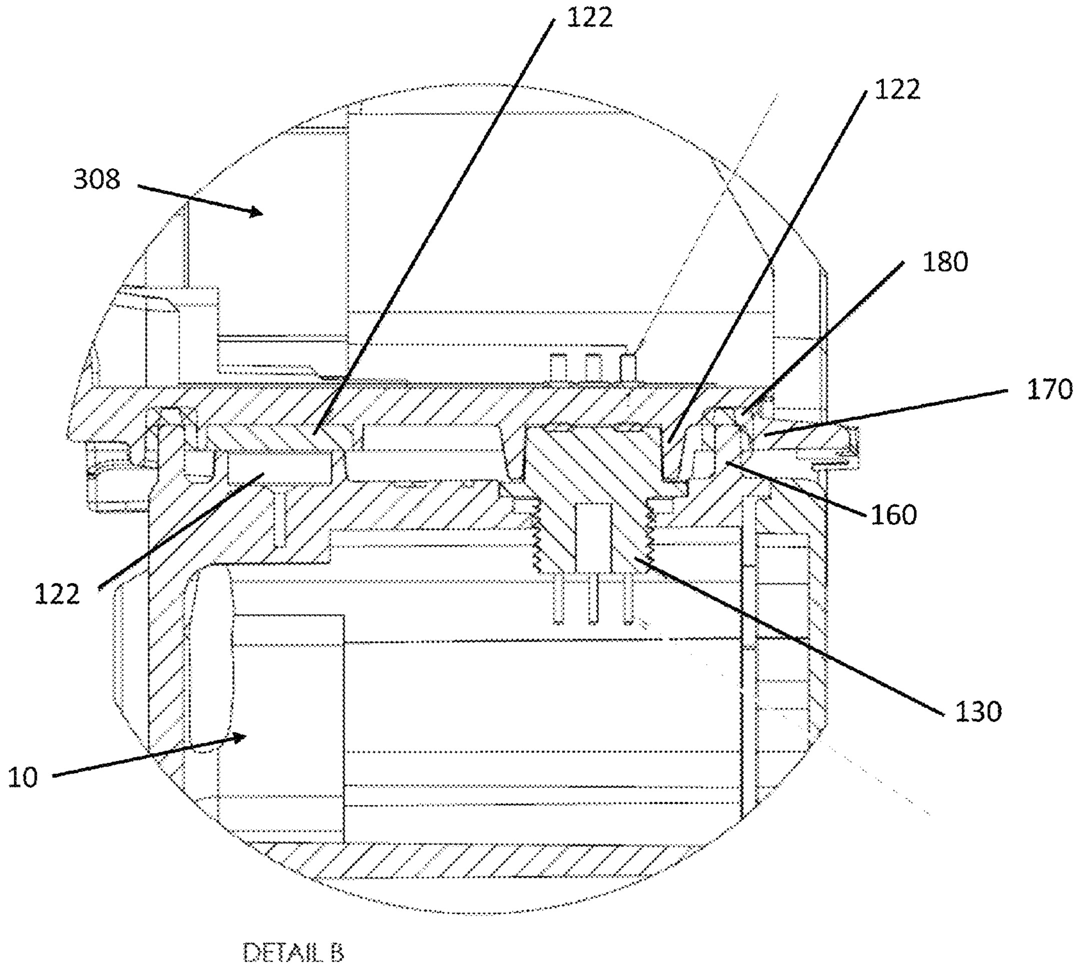
FIG. 30 is detail B from FIG. 29.

A electronic port 130 is also located on the exterior surface 110 of the housing device 10. The preferred electronic port 130 is a mateable electrical connection. The preferred embodiment of the mateable electrical connection is shown in FIG. 1-30. FIG. 3, for example, shows a protruding electronic port 140 having receptacles 134 (the female connector) for accepting pins 136 (the male connector). FIGS. 22 and 27 show the complementary electronic port 132, a recessed electronic port 150 having pins 136 for insertion into the receptacles 134. A person of skill in the art would recognize various combinations and ways to construct a mateable electrical connection like the embodiment shown here.

Figure 14:
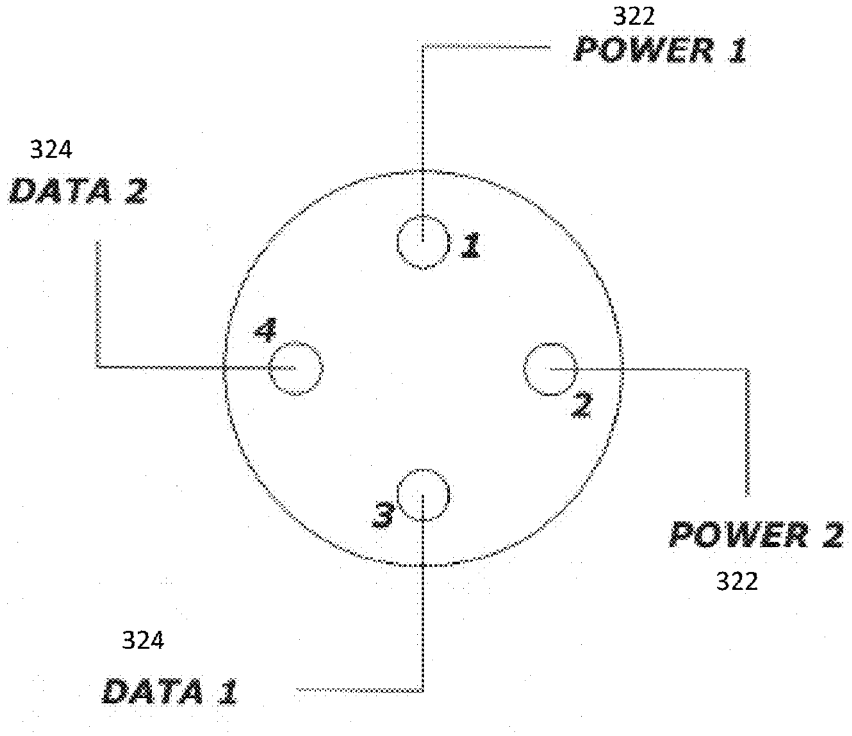
FIG. 14 is a wiring schematic for the data/power interface.
Figure 15:
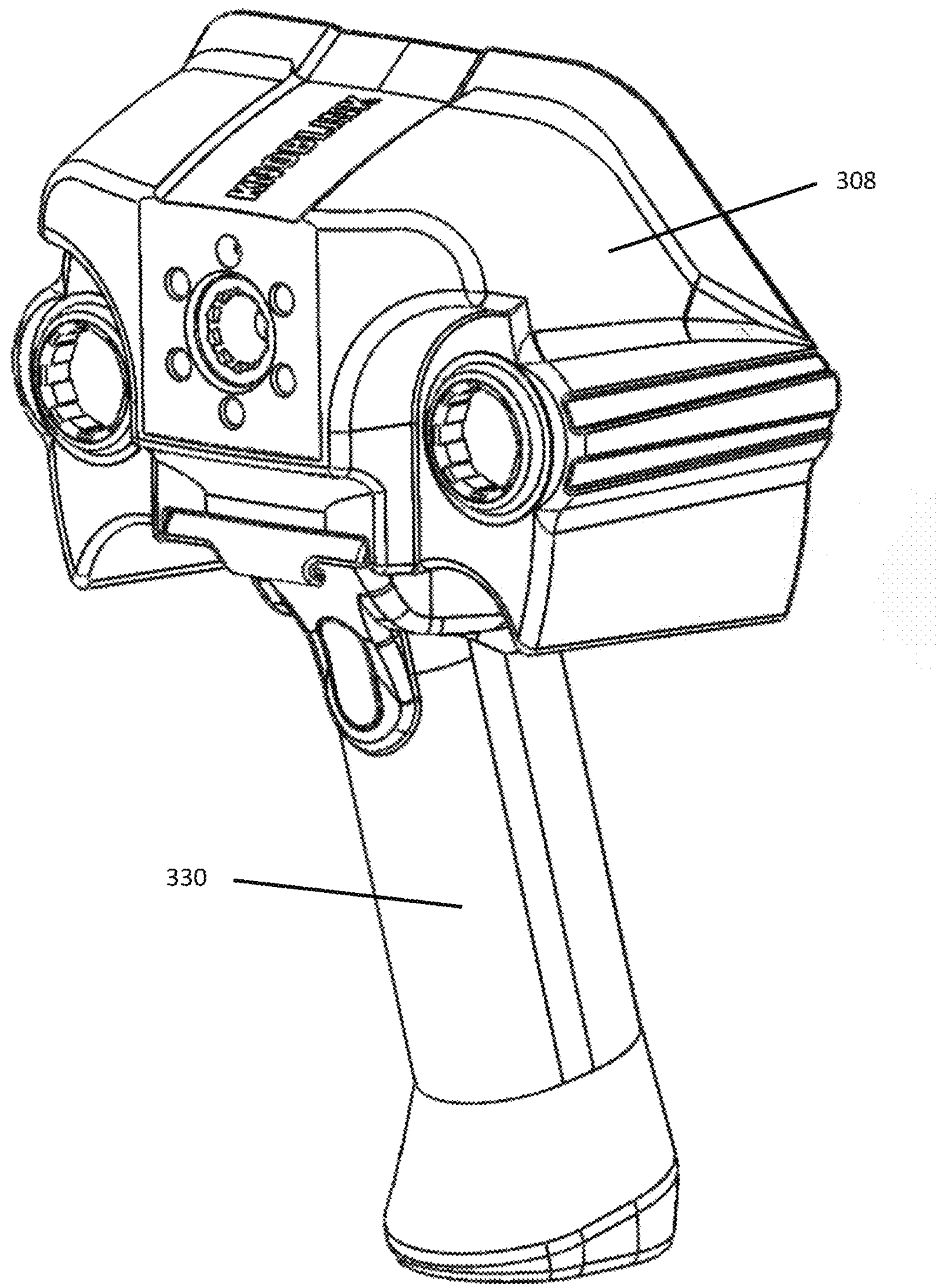
FIG. 15 is a perspective view of a hand-held power pack 330 connected to a thermal imaging camera (or "tic camera") by an embodiment of the power and data port interface.
Figure 16:
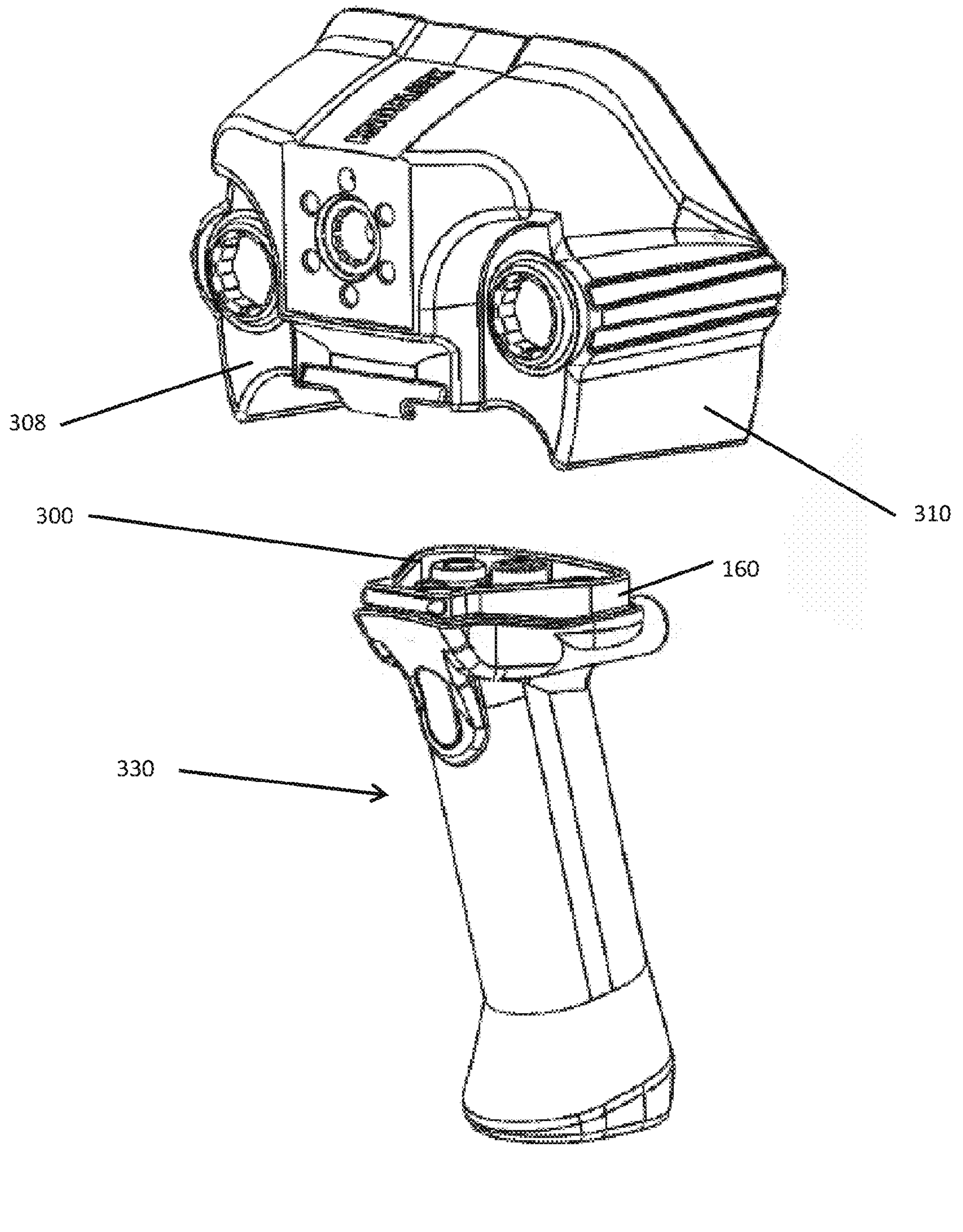
FIG. 16 is the same view as FIG. 15 with the tic camera separated from the power pack and showing a power/data interface.
Figure 17:
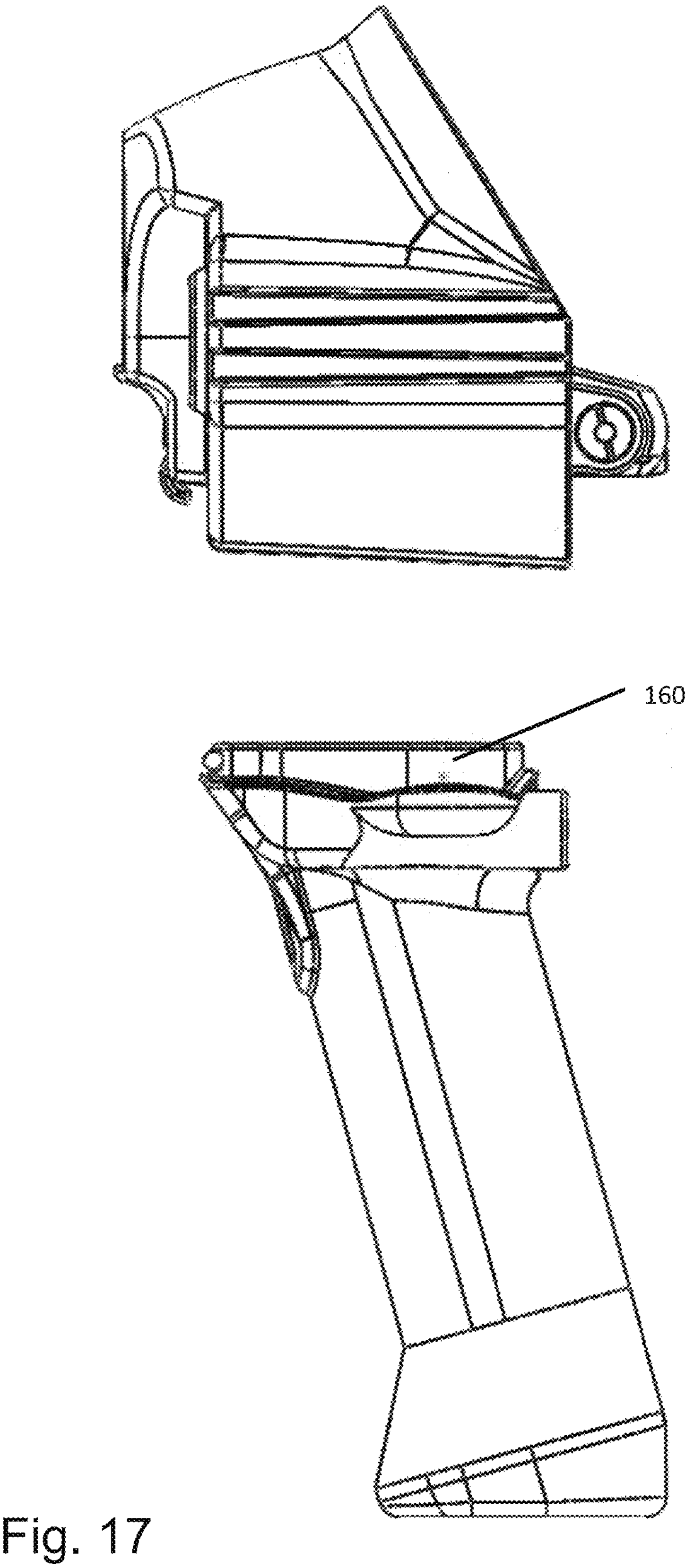
FIG. 17 is a side view of FIG. 16.
Figure 18:
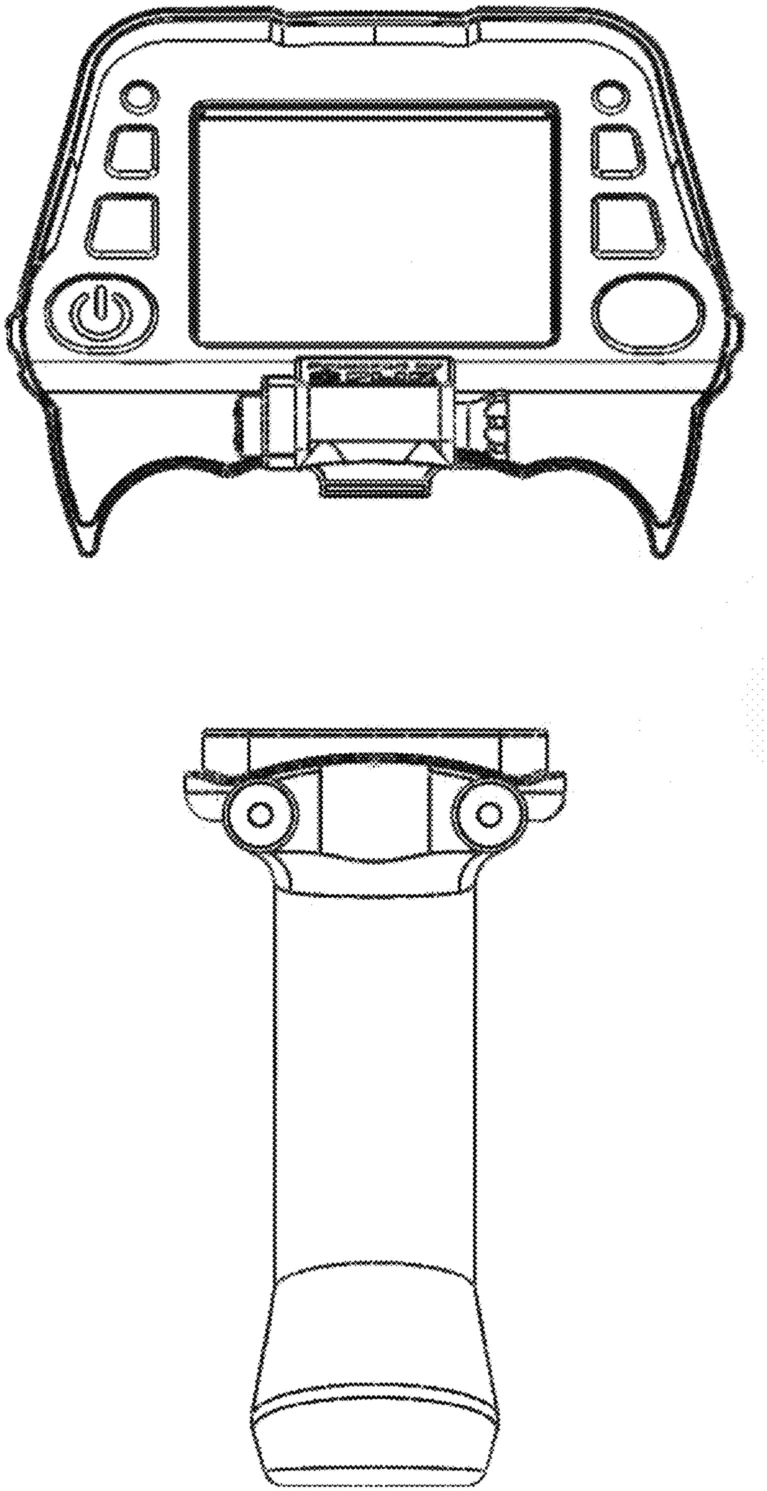
FIG. 18 is a rear view of FIG. 16.
Figure 19:
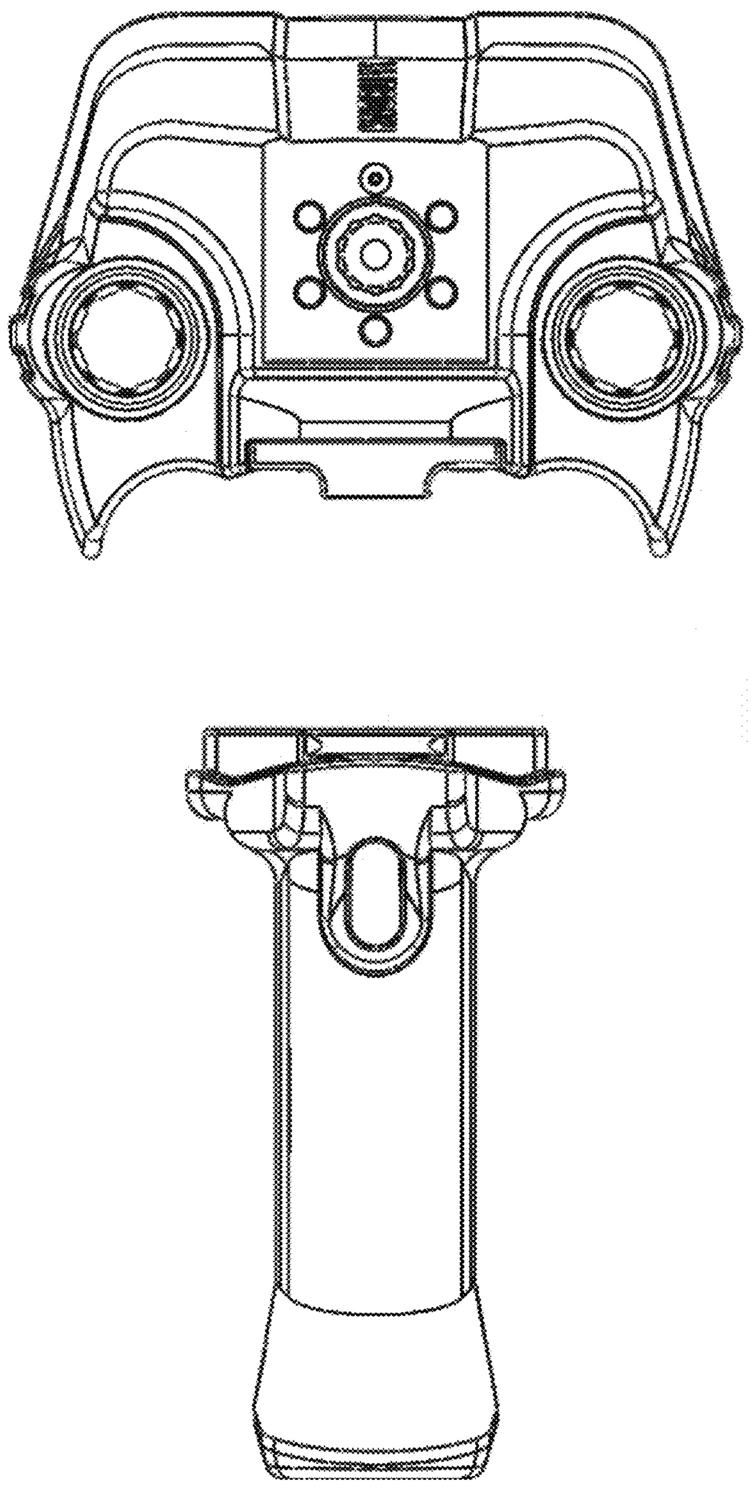
FIG. 19 is a side view of FIG. 16.
Figure 20:
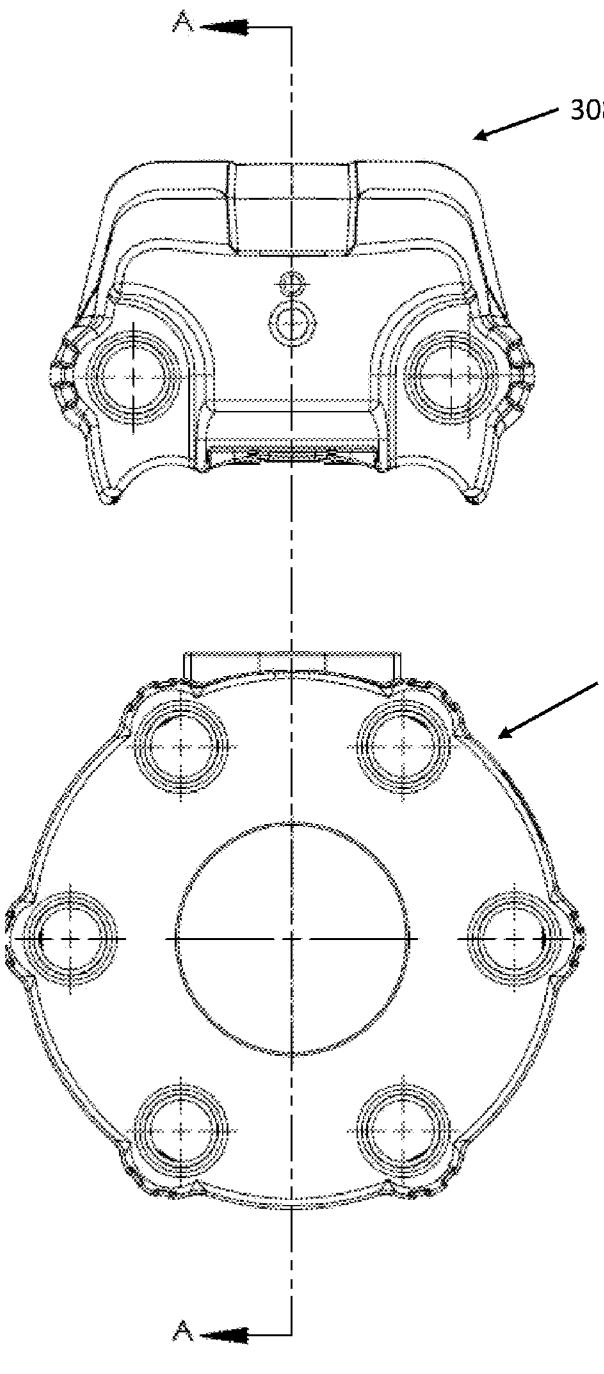
FIG. 20 is a front view of a housing device 10 and an accessory 308, specifically, a thermal imaging camera 310.
Figure 21:
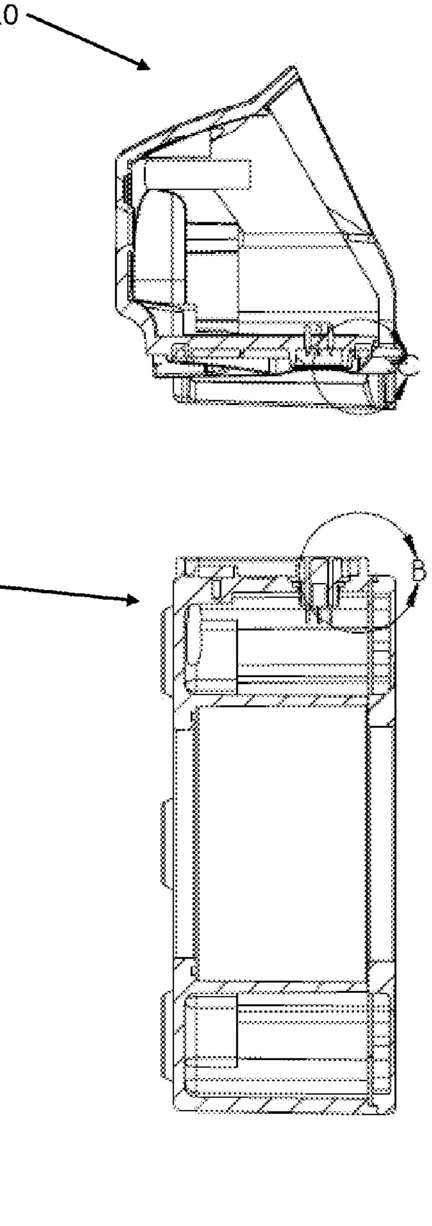
FIG. 21 is section A-A of FIG. 20.

The preferred electronic port 130 includes connections for both power and data transfer between the housing device 10 and an accessory 308. As shown in FIG. 14, electronic port 130 links power and data between the accessory 308 and the housing device 10. The electronic port 130 preferably comprises four conductors 318 that create electrical and data flow, bi-directionally, from the power source inside the housing device 10, such as power source 70, to the attached accessory 308.

The electronic port 130 preferably has two (2) power conductors 322, one (1) positive terminal, one (1) negative terminal. Likewise, there are preferably two (2) conductors 324 that permit data to flow between the housing device 10 and the detachable electronic device 308. This data can be video data, thermal imaging data, communication data or any other data that might be desired by a user.

The preferred power/data interface 100 is triangular in shape, but other shapes may be suitable. The important aspect of the shape is that the interface 100 be configured so that there is only one way for the housing device 10 and accessory 308 can mate. That way, in the chaos present at the leading edge of a fire suppression operation, the user knows that the housing device 10 is connected correctly by fit and feel rather than having to read labels. As shown in FIG. 1, the preferred interface 100 has three magnetic connectors 120 forming a perimeter around the electronic port 130.

Referring now to FIG. 3, the preferred power/data interface 100 has a continuous rib 160 surrounding the magnetic connectors 120. The continuous rib 160 projects outwardly from the exterior surface 110. The continuous rib 160 mates with a continuous channel 170, shown in FIG. 27. It makes no difference whether the continuous rib 160 goes on the housing device 10 and the continuous channel 170 goes on the accessory 308 or vice-versa. What is important it that the continuous rib 160 mates with the continuous channel 170 to create a tight fit (e.g., a friction-fit) so that water and dirt cannot penetrate the interior of the interface 100 when the housing device 10 is mated with an accessory 308. Keeping out water and dirt makes the connection intrinsically safe and reduces static discharge or random electrical impulse, which is critical in a flammable environment operation. In addition, it is preferred to add a gasket 180 within the continuous channel 170 to further seal the mated connection. If possible, the gasket should cover all three sides of the channel 170.

FIGS. 2, 5, 6, 15-30 all illustrate embodiments where a housing device 10 connects to an accessory 308. Each of the electronic accessories 308 has a complementary electronic port 132 mounted on a second exterior surface 112 for mating with electronic port 130 on the housing device 10. Likewise, complementary magnetic connectors 122 are located on the second exterior surface 112 to mate with the magnetic connectors 120 on the housing device 10. Also, as previously discussed, a continuous channel 170 surrounding the complementary magnetic connectors 122 mates with the continuous rib 160.

The power/data interface 100 can serve multiple purposes. First, it can provide power to accessory 308 by connecting it to a power source (such as power source 70) located inside the housing device 10. Second, the power/data interface 100 can exchange data between the accessory 308 and the housing device 10. Such exchange of data enables the housing device 10 to record and protect data captured by accessory 308 on a flash drive or other recordable media located inside housing device 10. In addition, the exchange of data permits the power/data interface 100 to identify when different accessories 308 are attached and to recognize various states of those accessories 308 (e.g., on/off, recording, standby, etc.)

In addition to providing power and exchanging data with accessory 308, the power/data interface 100 can also accept battery pack 314 that can be used to recharge a battery or other power sources located inside the housing device 10, such as internal power source 70.

Figure 12:
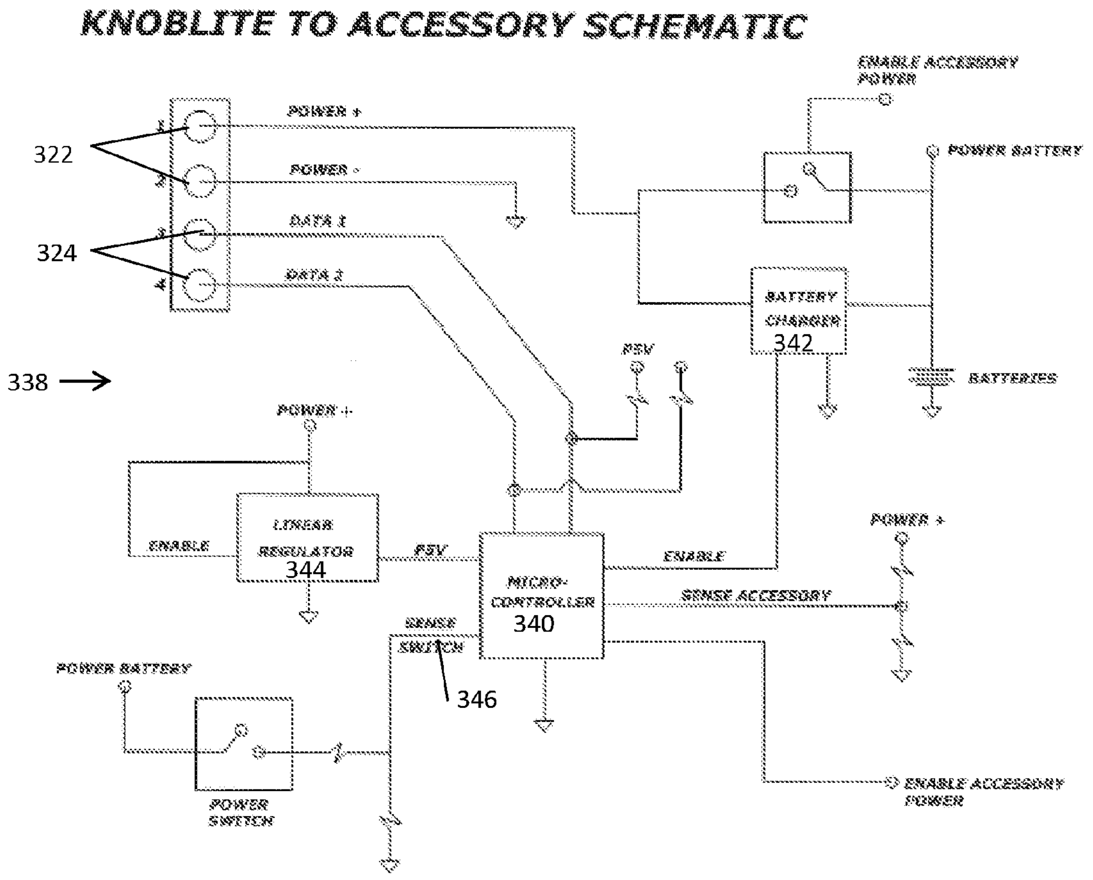
FIG. 12 is a wiring schematic for the data/power interface.
Figure 13:
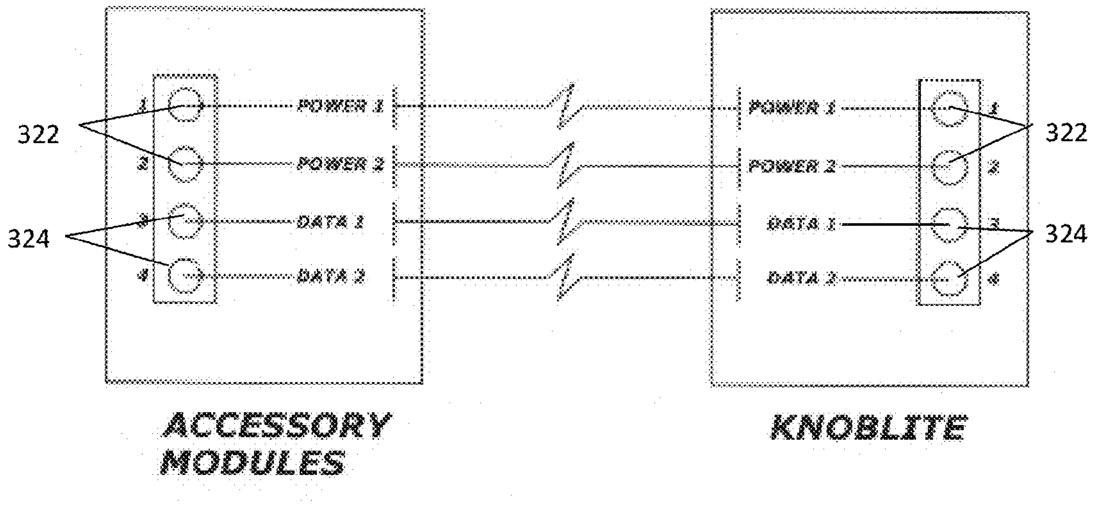
FIG. 13 is a wiring schematic for the data/power interface.

FIG. 12 illustrates an embodiment of port circuitry 338 for use with the power/data interface 100. As shown, port circuitry 338 includes a micro-controller 340, a battery charger 342, a linear regulator 344, a sense switch 346, and other switches and components.

In operation, when a user attaches an accessory 308 to a housing device 10 (or hand-grip unit 330), micro-controller 340 will sense voltages from accessory 308 via power conductors 322 and data conductors 324 to detect the presence of an accessory 308. The micro-processor 340 communicates with accessory 308 to determine what it is (e.g., a tic camera, video device, communication device, battery, etc.). Depending on what accessory 308 is attached, microprocessor 340 will start communicating with accessory 308 thru data conductors 324 to transfer information, pass control to accessory. Information passed to the housing device 10 can include data (such as thermal imaging data) to store within the housing device 10 on a flash drive or other storage media. The housing device 10 can offer protection from the extreme conditions for the data storage device.

Power conductors 322 can be used to power the accessory 308 from a power source or battery inside the housing device 10, such as power source 70 by way of example. Conversely, power conductors 322 can be used to charge a power source inside housing device 10, such as power supply 70 by way of example.

In the alternative, as shown in FIGS. 15-19, the data/power interface 100 can also be connected to an alternative embodiment of a housing unit 10, a hand-grip unit 330, which also serves as an interface between hand-grip unit 330 and an accessory 308. The hand-grip unit 330 can also house power sources, like a battery, and recording media to power accessory 308 and record data captured by accessory 308 in the same way describe above for housing device 10.

While embodiments of the disclosure have been described in terms of various specific embodiments, those skilled in the art will recognize that the embodiments of the disclosure may be practiced with modifications within the spirit and scope of the claims.

What is claimed is:

1. An electronic port interface system for use at the leading edge of a fire suppression operation, the electronic port interface system comprising:

an exterior surface of a housing enclosing a power source;

at least three first magnetic connectors located on the exterior surface, a perimeter formed by an outermost part of each of the magnetic connectors;

a continuous rib surrounding the perimeter, the continuous rib projecting outwardly from the exterior surface; and a first electronic port on the exterior surface located within the perimeter, the electronic port for mating with an electronic accessory, wherein the electronic accessory comprises:

a second exterior surface;

at least three second magnetic connectors located on the second exterior surface, the magnetic connectors configured on the second exterior surface to mate with the first magnetic connectors;

a continuous channel surrounding the second magnets, the continuous channel configured to mate with the continuous rib; and a second electronic port on the second exterior surface, the second electronic port configured to mate with the first electronic port.

2. The electronic port interface system in claim 1, wherein the electronic accessory further comprises a gasket located inside the continuous channel, the gasket configured to seal the perimeter when the continuous channel and the continuous rib mate.

3. The electronic port interface system in claim 1, wherein the continuous rib further includes a varying contour relative to the exterior surface and the continuous channel further includes a complementary contour so that the continuous channel and the continuous rib mate tightly at a certain orientation.

4. The electronic port interface system in claim 1 further comprises a port circuitry configured to determine a type of the electronic accessory.

5. The electronic port interface system in claim 1, wherein the first electronic port and the second electronic port are configured to allow an electric charge flow bi-directionally.

6. The electronic port interface system in claim 5 further comprises a port circuitry configured to determine a direction of the electric charge.

7. An electronic port interface system for use at the leading edge of a fire suppression operation, the electronic port interface system comprising:

an exterior surface of a housing enclosing a power source;

at least three first magnetic connectors located on the exterior surface, a perimeter formed by an outermost part of each of the magnetic connectors;

a continuous channel surrounding the perimeter; and a first electronic port on the exterior surface located within the perimeter, the electronic port for mating with an electronic accessory, wherein the electronic accessory comprises:

a second exterior surface;

at least three second magnetic connectors located on the second exterior surface, the magnetic connectors configured on the second exterior surface to mate with the first magnetic connectors;

a continuous rib surrounding the second magnets, the continuous rib projecting outwardly from the second exterior surface and configured to mate with the continuous channel; and a second electronic port on the second exterior surface, the second electronic port configured to mate with the first electronic port.

8. The electronic port interface system in claim 7, wherein the electronic accessory further comprises a gasket located inside the continuous channel, the gasket configured to seal the perimeter when the continuous channel and the continuous rib mate.

9. The electronic port interface system in claim 7, wherein the continuous rib further includes a varying contour relative to the exterior surface and the continuous channel further includes a complementary contour so that the continuous channel and the continuous rib mate tightly at a certain orientation.

10. The electronic port interface system in claim 7 further comprises a port circuitry configured to determine a type of the electronic accessory.

11. The electronic port interface system in claim 7, wherein the first electronic port and the second electronic port are configured to allow an electric charge flow bi-directionally.

12. The electronic port interface system in claim 11 further comprises a port circuitry configured to determine a direction of the electric charge.

* * * * *